US012355693B2

(12) United States Patent
Guo et al.

(10) Patent No.: US 12,355,693 B2
(45) Date of Patent: Jul. 8, 2025

(54) METHODS AND APPARATUS FOR SYMBOL-TO-SYMBOL MULTIPLEXING OF CONTROL, DATA, AND REFERENCE SIGNALS ON AN UPLINK

(71) Applicant: Marvell Asia Pte, Ltd., Singapore (SG)

(72) Inventors: Yuanbin Guo, Mountain House, CA (US); Hong Jik Kim, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 817 days.

(21) Appl. No.: 17/555,314

(22) Filed: Dec. 17, 2021

(65) Prior Publication Data

US 2022/0116174 A1 Apr. 14, 2022

Related U.S. Application Data

(63) Continuation of application No. 16/400,992, filed on May 1, 2019, now Pat. No. 11,239,964.

(60) Provisional application No. 62/665,142, filed on May 1, 2018.

(51) Int. Cl.
*H04L 12/26* (2006.01)
*H04L 5/00* (2006.01)
*H04L 27/26* (2006.01)

(52) U.S. Cl.
CPC .......... *H04L 5/0048* (2013.01); *H04L 5/0046* (2013.01); *H04L 27/2602* (2013.01); *H04L 27/26134* (2021.01)

(58) Field of Classification Search
None
See application file for complete search history.

(56) References Cited

U.S. PATENT DOCUMENTS

| 2019/0215127 | A1 | 7/2019 | Li |
| 2019/0230688 | A1* | 7/2019 | Huang ............... H04L 5/001 |
| 2019/0268926 | A1 | 8/2019 | Yoshimura |
| 2020/0068496 | A1 | 2/2020 | Yang |
| 2020/0177351 | A1* | 6/2020 | Chen Larsson ....... H04L 5/0053 |

OTHER PUBLICATIONS

3GPP TS36.211.

(Continued)

*Primary Examiner* — Zewdu A Beyen
(74) *Attorney, Agent, or Firm* — JW Law Group; James M. Wu

(57) ABSTRACT

Methods and apparatus for symbol-to-symbol multiplexing of control, data, and reference signals on a 5G uplink. In one aspect, a job descriptor generator is configured to calculate mapping parameters for each symbol based on high level configuration parameters. A data/UCI multiplexing job engine, which is coupled to the job descriptor generator, provides symbol-based multiplexing and mapping which includes calculating reserved locations for PTRS and DMRS based on frequency-domain mapping of both PTRS and DMRS and multiplexing of data and controls from calculated intermediate parameters. A downstream processor is coupled to the job engine and configured to modulate data and control REs and insert DMRS or PTRS. In one example, the job descriptor generator is a configurable DSP processor and the job engine is an ASIC hardware accelerator.

40 Claims, 6 Drawing Sheets

(56) References Cited

OTHER PUBLICATIONS

D. Wang, S. Yang, Y.Liao, Y. Liu, Efficient Receiver Scheme for LTE PUCCH, IEEE communications letters, vol. 16, pp. 352-355, 2012.
Y. Wu, E. G. Larsson, On ACK/NACK messages detection in the LTE PUCCH with multiple receive antennas, 20th European signal processing conference (EUSIPCO 2012), pp. 994-998.

* cited by examiner

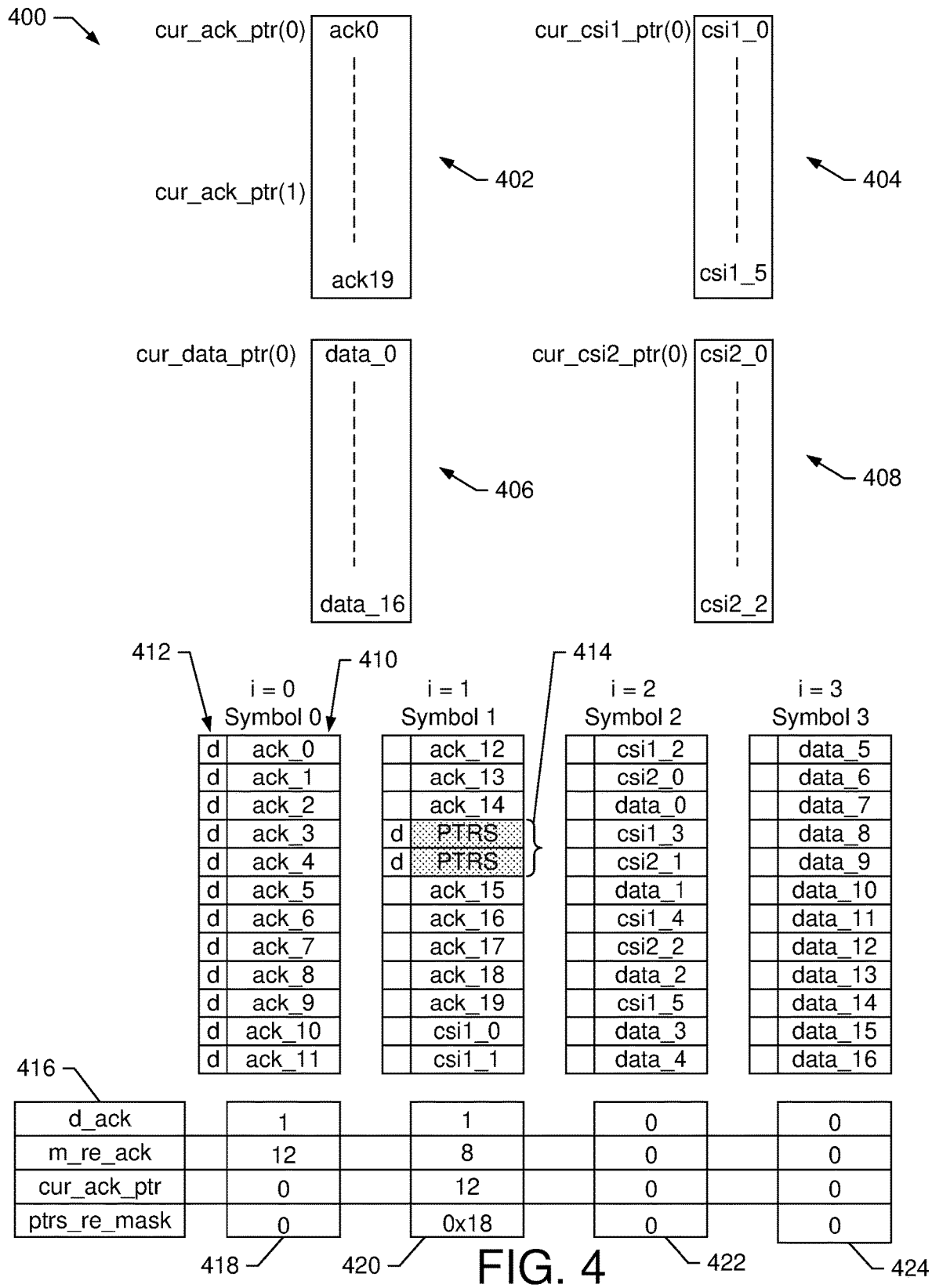

METHODS AND APPARATUS FOR SYMBOL-TO-SYMBOL MULTIPLEXING OF CONTROL, DATA, AND REFERENCE SIGNALS ON AN UPLINK

PRIORITY

This is a continuation patent application of a co-pending U.S. patent application having a U.S. patent application Ser. No. 16/400,992, filed on May 1, 2019 in the name of the same inventor and entitled "Methods and Apparatus for Symbol-to-Symbol Multiplexing of Control, Data, and Reference Signals on A 5G Uplink," issued into a U.S. patent with a U.S. Pat. No. 11,239,964 on Feb. 1, 2022, which further claims the benefit of priority from U.S. Provisional Application No. 62/665,142, filed on May 1, 2018, and entitled "Method and Apparatus for Symbol-by-Symbol UCI and Data Multiplexing with Bit-Masking Assisted DMRS and PTRS Mapping in 5G New Radio Uplink," all of which are hereby incorporated herein by reference in their entirety.

FIELD

The exemplary embodiments of the present invention relate to telecommunications network. More specifically, the exemplary embodiments of the present invention relate to receiving and processing data stream via a wireless communication network.

BACKGROUND

With a rapidly growing trend of mobile and remote data access over a high-speed communication network such as 3G or 4G cellular services, accurately delivering and deciphering data streams become increasingly challenging and difficult. The high-speed communication network which is capable of delivering information includes, but not limited to, wireless network, cellular network, wireless personal area network ("WPAN"), wireless local area network ("WLAN"), wireless metropolitan area network ("MAN"), or the like. While WPAN can be Bluetooth or ZigBee, WLAN may be a Wi-Fi network in accordance with IEEE 802.11 WLAN standards.

As defined in the Third Generation Partnership Project (3GPP) specification for Fifth Generation (5G) New Radio (NR) uplink communications, Uplink Control Information (UCI) bits and data bits are multiplexed with Demodulation Reference Symbols (DMRS) and Phase Tracking Reference Symbols (PTRS). For example, the UCI includes acknowledgement bits (ACK), first channel state information (CSI1), and second channel state information (CSI2). Although sections in the 3GPP specification provide algorithms for multiplexing these different streams of bits, as well as the frequency and time allocation of the reference symbols in a resource grid, a straightforward implementation of the specification not only involves many complex calculations that are not suitable for implementation by an application specific integrated circuit (ASIC), but also cannot enable symbol-by-symbol level task allocation, which provides low processing latency that is critical for many 5G applications.

Therefore, it would be desirable to have a mechanism that provides multiplexing of UCI and data bits using a symbol-by-symbol task allocation that uses less implementation resources and provides lower processing latency than conventional systems.

SUMMARY

The following summary illustrates simplified versions of one or more aspects of present invention. The purpose of this summary is to present some concepts in a simplified description as more detailed descriptions are presented below.

An apparatus such as a network system includes a processor, accelerator, and modulation controller. In one aspect, the processor is configured to calculate mapping parameters for each symbol based on high level configuration parameters. The accelerator which is coupled to the processor provides symbol-based multiplexing and resource mapping and reference symbol bit masking, which includes masking reserved locations for PTRS based on frequency domain mapping of PTRS and DMRS and multiplexing data and controls from pre-calculated intermediate parameters. The modulation controller is coupled to the accelerator and configured to modulate data and control REs and inserting DMRS or PTRS. In one example, the processor is a DSP processor and the accelerator is an ASIC hardware accelerator.

In an embodiment, a method is provided that comprises marking a reserved resource element of an OFDM symbol that is reserved for a reference symbol (RS), and writing at least one of ACK, CSI1, CSI2, and data bits into available resource elements of the symbol according to predetermined parameters to produce a multiplexed bit sequence. The reserved resource element is avoided during this writing operation. The method also comprises scrambling the multiplexed bit sequence to generate a scrambled bit sequence, modulating the scrambled bit sequence to produce modulated symbols, and inserting the reference symbol into the reserved resource element of the modulated symbols.

Additional features and benefits of the exemplary embodiments of the present invention will become apparent from the detailed description, figures and claims set forth below.

BRIEF DESCRIPTION OF THE DRAWINGS

The exemplary aspect(s) of the present invention will be understood more fully from the detailed description given below and from the accompanying drawings of various embodiments of the invention, which, however, should not be taken to limit the invention to the specific embodiments, but are for explanation and understanding only.

FIG. 4 show block diagrams illustrating an example of multiplexing of different bit streams with bit-masking of the PTRS or DMRS resource mapping in accordance with embodiments of the present invention.

DETAILED DESCRIPTION

Figure 1:
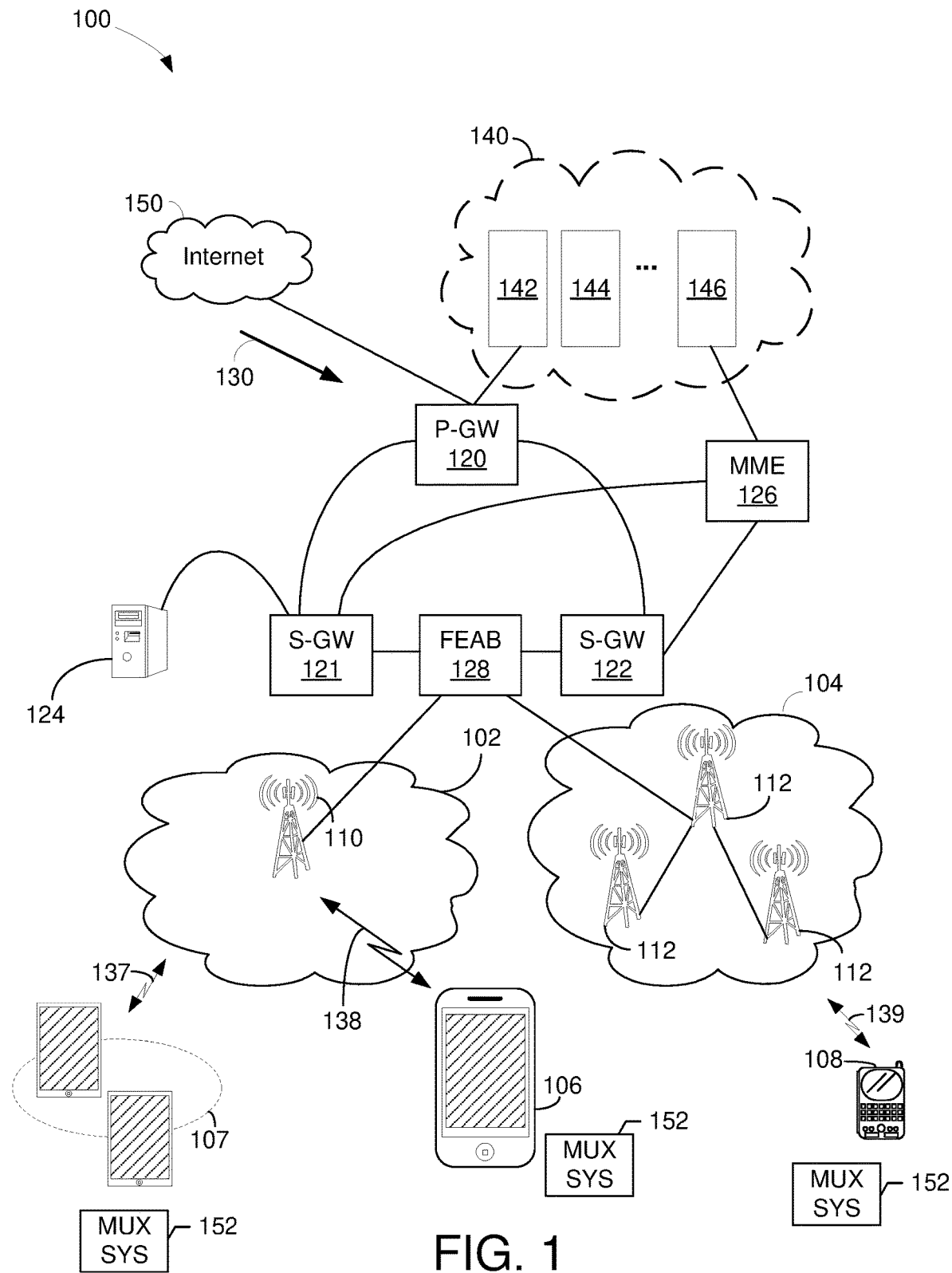
FIG. 1 shows a communication network configured to provide uplink communications having multiplexed UCI and data information bits in accordance with embodiments of the present invention.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit and receive data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

FIG. 1 shows a communication network 100 configured to provide uplink communications having multiplexed UCI and data information bits in accordance with embodiments of the present invention. The communication network 100 includes packet data network gateway ("P-GW") 120, two serving gateways ("S-GWs") 121-122, two base stations (or cell sites) 102-104, server 124, and Internet 150. P-GW 120 includes various components 140 such as billing module 142, subscribing module 144, tracking module 146, and the like to facilitate routing activities between sources and destinations. It should be noted that the underlying concept of the exemplary embodiments of the present invention would not change if one or more blocks (or devices) were added to or removed from communication network 100.

The communication network 100 may also be referred to as a third generation (3G), fourth generation (4G), long term evolution (LTE), fifth generation (5G), or a combination of 3G/4G/5G cellular network configurations. A mobility management entity (MME) 126, is coupled to base stations (or cell sites) and S-GWs capable of facilitating data transfer between 3G and LTE (long term evolution) or between 2G and LTE. MME 126 performs various controlling/managing functions, network securities, and resource allocations.

S-GW 121 or 122, in one example, coupled to P-GW 120, MME 126, and base stations 102 or 104, is capable of routing data packets from base station 102, or eNodeB, to P-GW 120 and/or MME 126. A function of S-GW 121 or 122 is to perform an anchoring function for mobility between 3G and 4G equipment. S-GW 122 is also able to perform various network management functions, such as terminating paths, paging idle UEs, storing data, routing information, generating replica, and the like.

The P-GW 120, coupled to S-GWs 121-122 and Internet 150, is able to provide network communication between user equipment ("UE") and IP based networks such as Internet 150. P-GW 120 is used for connectivity, packet filtering, inspection, data usage, billing, or PCRF (policy and charging rules function) enforcement. P-GW 120 also provides an anchoring function for mobility between 3G and 4G (or LTE) packet core networks.

Sectors or blocks 102-104 are coupled to a base station or FEAB 128 which may also have known as cell site, node B, or eNodeB. Sectors 102-104 include one or more radio towers 110 or 112. Radio tower 110 or 112 is further coupled to various UEs, such as a cellular phone 106, a handheld device 108, tablets and/or iPad® 107 via wireless communications or channels 137-139. Devices 106-108 can be portable devices or mobile devices, such as iPhone®, BlackBerry®, Android®, and so on. Base station 102 facilitates network communication between mobile devices such as UEs 106-107 with S-GW 121 via radio towers 110. It should be noted that base stations or cell sites can include additional radio towers as well as other land switching circuitry.

Server 124 is coupled to P-GW 120 and base stations 102-104 via S-GW 121 or 122. In one embodiment, server 124 which contains a soft decoding mechanism that is able to distribute and/or manage soft decoding and/or hard decoding based on predefined user selections. In one exemplary instance, upon detecting downstream push data 130 addressing to mobile device 106, which is located in a busy traffic area or noisy location, base station 102 can elect to decode the downstream using the soft decoding scheme distributed by server 124. One advantage of using the soft decoding scheme is that it provides more accurate data decoding, whereby overall data integrity may be enhanced.

When receiving bit-streams via one or more wireless or cellular channels, a decoder can optionally receive or decipher bit-streams with hard decision or soft decision. A hard decision is either 1 or 0 which means any analog value greater than 0.5 is a logic value one (1) and any analog value less than 0.5 is a logic value zero (0). Alternatively, a soft decision or soft information can provide a range of value from 0, 0.2, 0.4, 0.5, 0.6, 0.8, 0.9, and the like. For example, soft information of 0.8 would be deciphered as a highly likelihood one (1) whereas soft information of 0.4 would be interpreted as a weak zero (0) and may be one (1).

In various exemplary embodiments, the user equipment (e.g., devices 106-108) each comprise a multiplexing system (MUX) 152 that operates to multiplex the UCI bits and the data bits with the DMRS and the PTRS to fulfill requirements of the specification for 3GPP 5G NR uplink communications. The MUX 152 performs symbol-by-symbol processing to multiplex the above different data streams and to map the multiplexed sequence to the NR resource grid. The MUX 152 comprises an efficient easy-to-implement system that can provide lower processing latency than conventional systems. A more detailed description of the MUX 152 is provided below.

Uplink Multiplexing Under 3GPP

In 3GPP 5G NR uplink communications, the UCI bits and the data bits are multiplexed with the DMRS and the PTRS. Although the 3GPP specification specifies detailed algorithms on multiplexing these different streams of bits as well as the frequency and time allocation of the reference symbols in a resource grid, a straightforward implementation of the specification involves many complex calculations that are not suitable for ASIC implementation and cannot enable symbol-by-symbol level task allocation.

The uplink control information is composed of ACK bits, CSI part 1 (CSI1), and CSI part2 (CSI2) bits. This control information is to be multiplexed with the UL-SCH data bits according to procedures outlined in the 3PGG specification as follows.

Parameter Calculations

Denote the coded bits for UL-SCH as:
$g_0^{UL-SCH}, g_1^{UL-SCH}, g_2^{UL-SCH}, g_3^{UL-SCH}, \ldots, g_{G^{UL-SCH}-1}^{UL-SCH}$.

Denote the coded bits for HARQ-ACK, if any, as:
$g_0^{ACK}, g_1^{ACK}, g_2^{ACK}, g_3^{ACK}, \ldots, g_{G^{ACK}-1}^{ACK}$.

Denote the coded bits for CSI part 1, if any, as:
$g_0^{CSI-part1}, g_1^{CSI-part1}, g_2^{CSI-part1}, g_3^{CSI-part1}, \ldots, g_{G^{CSI-part1}-1}^{CSI-part1}$.

Denote the coded bits for CSI part 2, if any, as:
$g_0^{CSI-part2}, g_1^{CSI-part2}, g_2^{CSI-part2}, g_3^{CSI-part2}, \ldots, g_{G^{CSI-part2}-1}^{CSI-part2}$.

Denote the multiplexed data and control coded bit sequence as:
$g_0, g_1, g_2, g_3, \ldots, g_{G-1}$.

Denote $l$ as the OFDM symbol index of the scheduled PUSCH, starting from 0 to $N_{symb,all}^{PUSCH}-1$, where $N_{symb,all}^{PUSCH}$ is the total number of OFDM symbols of the PUSCH, including all OFDM symbols used for DMRS.

Denote $k$ as the subcarrier index of the scheduled PUSCH, starting from 0 to $M_{sc}^{PUSCH}-1$, where $M_{sc}^{PUSCH}$ is the scheduled bandwidth of the PUSCH, expressed as a number of subcarriers.

Denote $\Phi_l$ as the set of resource elements, in ascending order of indices k, available for transmission of data or UCI in OFDM symbol l, for $l=0, 1, 2, \ldots, N_{symb,all}^{PUSCH}-1$.

Denote $M_{sc}^{\Phi}(l)=|\Phi_l|$ as the number of elements in set $\Phi_l$.

Denote $\Phi_l(j)$ as the $j^{th}$ element in $\Phi_l$.

If frequency hopping is configured for the PUSCH then denote the following.

Denote $l^{(1)}$ as the OFDM symbol index of the first OFDM symbol after the first set of consecutive OFDM symbol(s) carrying DMRS in the first hop.

Denote $l^{(2)}$ as the OFDM symbol index of the first OFDM symbol after the first set of consecutive OFDM symbol(s) carrying DMRS in the second hop.

Denote $l_{CSI}^{(1)}$ as the OFDM symbol index of the first OFDM symbol that does not carry DMRS in the first hop.

Denote $l_{CSI}^{(2)}$ as the OFDM symbol index of the first OFDM symbol that does not carry DMRS in the second hop.

If HARQ-ACK is present for transmission on the PUSCH, define the following.

$$G^{ACK}(1)=N_L \cdot Q_m \cdot \lfloor G^{ACK}/(2 \cdot N_L \cdot Q_m) \rfloor \text{ and}$$

$$G^{ACK}(2)=N_L \cdot Q_m \cdot \lceil G^{ACK}/(2 \cdot N_L \cdot Q_m) \rceil$$

If CSI is present for transmission on the PUSCH, define the following.

$$G^{CSI-part1}(1)=N_L \cdot Q_m \cdot \lfloor G^{CSI-part1}/(2 \cdot N_L \cdot Q_m) \rfloor$$

$$G^{CSI-part1}(2)=N_L \cdot Q_m \cdot \lceil G^{CSI-part1}/(2 \cdot N_L \cdot Q_m) \rceil$$

$$G^{CSI-part2}(1)=N_L \cdot Q_m \cdot \lfloor G^{CSI-part2}/(2 \cdot N_L \cdot Q_m) \rfloor$$

$$G^{CSI-part2}(2)=N_L \cdot Q_m \cdot \lceil G^{CSI-part2}/(2 \cdot N_L \cdot Q_m) \rceil$$

Let $N_{hop}^{PUSCH}=2$, and denote $N_{symb,hop}^{PUSCH}(1)$, $N_{symb,hop}^{PUSCH}(2)$ as the number of OFDM symbols of the PUSCH in the first and second hop, respectively, where $N_L$ is the number of transmission layers of the PUSCH and $Q_m$ is the modulation order of the PUSCH.

If frequency hopping is not configured for the PUSCH, then denote the following.

Denote $l^{(1)}$ as the OFDM symbol index of the first OFDM symbol after the first set of consecutive OFDM symbol(s) carrying DMRS.

Denote $l_{CSI}^{(1)}$ as the OFDM symbol index of the first OFDM symbol that does not carry DMRS.

If HARQ-ACK is present for transmission on the PUSCH, let $G^{ACK}(1)=G^{ACK}$.

If CSI is present for transmission on the PUSCH, let $G^{CSI-part1}(1)=G^{CSI-part1}$, $G^{CSI-part2}(1)=G^{CSI-part2}$. $N_{hop}^{PUSCH}=1$ and $N_{symb,hop}^{PUSCH}(1)=N_{symb,all}^{PUSCH}$.

Given the above definitions, the multiplexed data and control coded bit sequence $g_0, g_1, g_2, g_3, \ldots, g_{G-1}$ is obtained according to the following operations.

Step 1 (HARQ-ACK Information is Less than or Equal to 2 Bits)

```
Set Φ̄_l = Φ_l for l = 0, 1, 2, ..., N_symb,all^PUSCH - 1 ;
Set M̄_sc^Φ(l) = |Φ̄_l| for l = 0, 1, 2, ..., N_symb,all^PUSCH - 1 ;
if   (HARQ-ACK is present for transmission on the PUSCH and the number of HARQ-
     ACK information bits is no more than 2);
then
     denote Φ_l^rvd as the set of reserved resource elements for potential HARQ-ACK
     transmission, in OFDM symbol l , for l = 0, 1, 2, ..., N_symb,all^PUSCH - 1 ;
     denote M̄_sc,rvd^Φ(l) = |Φ_l^rvd| as the number of elements in Φ_l^rvd ;
else
     Φ̄_l^rvd = ∅ for l = 0, 1, 2, ..., N_symb,all^PUSCH - 1 ;
     M̄_sc,rvd^Φ(l) = 0 for l = 0, 1, 2, ..., N_symb,all^PUSCH - 1 ;
end if
```

Step 2 (HARQ-ACK Information is More than 2 Bits)

```
if    (HARQ-ACK is present for transmission on the PUSCH and the number of HARQ-
      ACK information bits is more than 2)
      Set m_count^ACK(1) = 0 ;
      Set m_count^ACK(2) = 0 ;
      Set m_count,all^ACK = 0 ;
      for i = 0 to N_hop^PUSCH − 1
          l = l^(i) ;
          while m_count^ACK(i) < G^ACK(i)
              if G^ACK(i) − m_count^ACK(i) ≥ M̄_sc^Φ(l)·N_L·Q_m
                  d = 1 ;
                  m_count^RE = M̄_sc^Φ(l) ;
              end if
              if G^ACK(l) − m_count^ACK(i) < M̄_sc^Φ(l)·N_L·Q_m
                  d = ⌊M̄_sc^Φ(l)·N_L·Q_m/(G^ACK(i) − m_count^ACK(i))⌋;
                  m_count^RE = ⌈(G^ACK(l) − m_count^ACK(i))/(N_L·Q_m)⌉ ;
              end if
              for j = 0 to m_count^RE − 1
                  k = Φ_l(j·d);
                  for v = 0 to N_L·Q_m − 1
                      ḡ_{l,k,v} = g_{m_count,all^ACK}^ACK ;
                      m_count,all^ACK = m_count,all^ACK + 1 ;
                      m_count^ACK(i) = m_count^ACK(i) + 1 ;
                  end for
              end for
              for j = 0 to m_count^RE − 1
                  Φ_l = Φ_l \ {Φ_l(j·d)};
              end for
              M̄_sc^Φ(l) = |Φ_l| ;
              l = l + 1 ;
          end while
      end for
end if
```

30

Step 3 (CSI Bits Present)

```
if    (CSI is present for transmission on the PUSCH)
      Set m_count^CSI-part1(1) = 0 ;
      Set m_count^CSI-part1(2) = 0 ;
      Set m_count^CSI-part1 = 0 ;
      for i = 0 to N_hop^PUSCH − 1
          l = l_CSI^(i) ;
          while M̄_sc^Φ(l) − M̄_{sc,rvd}^Φ(l) ≤ 0
              l = l + 1 ;
          end while
          while m_count^CSI-part1(i) < G^CSI-part1(i)
              if G^CSI-part1(i) − m_count^CSI-part1(i) ≥ (M̄_sc^Φ(l) − M̄_{sc,rvd}^Φ(l))·NL·Qm
                  d = 1;
                  m_count^RE = M̄_sc^Φ(l) − M̄_{sc,rvd}^Φ(l);
              end if
              if G^CSI-part1(i) − m_count^CSI-part1(i) < (M̄_sc^Φ(l) − M̄_{sc,rvd}^Φ(l))·N_L·Q_m
                  d=⌊(M̄_sc^Φ(l) − M̄_{sc,rvd}^Φ(l))·N_L·Q_m/(G^CSI-part1(i) − m_count^CSI-part1(i))⌋;
                  m_count^RE = ⌈(G^CSI-part1(i) − m_count^CSI-part1(i))/(N_L·Q_m)⌉ ;
              end if
              Φ_l^temp = Φ_l \ Φ_l^rvd ;
              for j = 0 to m_count^RE − 1
                  k = Φ_l^temp(j·d);
                  for v = 0 to N_L·Q_m − 1
                      ḡ_{l,k,v} = g_{m_count,all^CSI-part1}^CSI-part1 ;
                      m_count,all^CSI-part1 = m_count,all^CSI-part1 + 1 ;
                      m_count,all^CSI-part1(i) = m_count,all^CSI-part1(i) + 1 ;
                  end for
              end for
              for j = 0 to m_count^RE − 1
                  Φ_l = Φ_l \ {Φ_l^temp(j·d)};
              end for
              M̄_sc^Φ(l)=|Φ_l| ;
              l = l + 1 ;
          end while
      end for
      Set m_count^CSI-part2(1) = 0 ;
      Set m_count^CSI-part2(2) = 0 ;
      Set m_count^CSI-part2 = 0 ;
      for i = 0 to N_hop^PUSCH−1
          l = l_CSI^(i) ;
          while M̄_sc^Φ(l) ≤ 0
              l = l + 1 ;
```

```
            end while
            while m_count^{CSI-part2}(i) < G^{CSI-part2}(i)
                if G^{CSI-part2}(i) - m_count^{CSI-part2}(i) ≥ (M̄_sc^Φ(l)·N_L·Q_m
                    d = 1 ;
                    m_count^{RE} = M̄_sc^Φ(l);
                end if
                if G^{CSI-part2}(i) - m_count^{CSI-part2}(i) < (M̄_sc^Φ(l)·N_L·Q_m)
                    d = ⌊(M̄_sc^Φ(l)·N_L·Q_m/G^{CSI-part2}(i) - m_count^{CSI-part2}(i))⌋;
                    m_count^{RE} = ⌈(G^{CSI-part2}(i) - m_count^{CSI-part2}(i))/(N_L·Q_m)⌉ ;
                end if
                for j = 0 to m_count^{RE} - 1
                    k = Φ̄_l(j·d);
                    for v = 0 to N_L · Q_m - 1
                        ḡ_{l,k,v} = g_{m_count,all}^{CSI-part2};
                        m_count,all^{CSI-part2} = m_count,all^{CSI-part2} + 1 ;
                        m_count^{CSI-part2}(i) = m_count^{CSI-part2}(i) + 1 ;
                    end for
                end for
                for j = 0 to m_count^{RE} - 1
                    Φ̄_l = Φ̄_l \{Φ̄_l(j·d)};
                end for
                M̄_sc^Φ(l)=|Φ̄_l| ;
                l = l + 1 ;
            end while
        end for
end if
```

Step 4

```
        Set m_count^{UL-SCH} = 0 ;
        for l = 0 to N_{symb,all}^{PUSCH} - 1
            for j = 0 to M̄_sc^Φ(l) - 1
                k = Φ̄_l(j);
                for v = 0 to N_L·Q_m - 1
                    ḡ_{l,k,v} = g_{m_count}^{UL-SCH} ;
                    m_count^{UL-SCH} = m_count^{UL-SCH} + 1 ;
                end for
            end for
        end for
```

Step 5 (HARQ-ACK Information Less than or Equal to 2 Bits)

```
if   (HARQ-ACK is present for transmission on the PUSCH and the number of HARQ-
     ACK information bits is no more than 2)
    Set m_count^{ACK}(1) = 0 ;
    Set m_count^{ACK}(2) = 0 ;
    Set m_{count,all}^{ACK} = 0 ;
    for i = 0 to N_{hop}^{PUSCH} - 1
        l = l^{(i)} ;
        while m_count^{ACK}(i) < G^{ACK}(i)
            if G^{ACK}(l) - m_count^{ACK}(i) ≥ M_sc^Φ(l)·N_L·Q_m
                d = 1 ;
                m_count^{RE} = M_sc^Φ(l);
            end if
            if G^{ACK}(l) - m_count^{ACK}(i) < M_sc^Φ(l)·N_L·Q_m
                d = ⌊M_sc^Φ(l)·N_L·Q_m/(G^{ACK}(i) - m_count^{ACK}(i))⌋;
                m_count^{RE} = ⌈(G^{ACK}(l) - m_count^{ACK}(i))/(N_L·Q_m)⌉ ;
            end if
            for j = 0 to m_count^{RE} - 1
                k = Φ_l(j·d);
                for v = 0 to N_L·Q_m - 1
                    ḡ_{l,k,v} = g_{m_count,all}^{ACK};
                    m_{count,all}^{ACK} = m_{count,all}^{ACK} + 1 ;
                    m_count^{ACK}(i) = m_count^{ACK}(i) + 1 ;
                end for
            end for
            l = l + 1 ;
        end while
    end for
end if
```

Step 6

```
Set t = 0 ;
  for l = 0 to N_symb,all^PUSCH - 1
    for j = 0 to M_sc^Φ(l) - 1
      k = Φ_l(j);
      for v = 0 to N_L · Q_m - 1
        g_t = ḡ_l,k,v ;
        t = t + 1 ;
      end for
    end for
  end for
```

The above procedure is given as an example of the on-going 3GPP specification. The various steps are very complicated for ASIC implementation and demand not only large data buffers for an entire transmission time interval (TTI), but also can lead to large processing latency. Especially because these procedures are intended for TTI based implementation, since many calculations are at the TTI level and the multiplexing has to be done in the TTI level with the nested loop structure as above. However, it is more desirable to have a symbol-by-symbol based implementation for shorter latency.

To achieve a symbol-by-symbol based implementation, the tasks of the above 6 steps are broken into two major computation entities that are provided by the multiplexing system 152. The first computation entity is a job descriptor generator that may be implemented using digital signal processing (DSP) processors or central processing unit (CPU) processors to calculate the mapping parameters for each symbol based on high-level configuration parameters. The nature of a software implementation of the intermediate parameter calculation can enable flexibility in case there is a change of the algorithm in the 3GPP specification. The second computation entity is a job engine that performs actual symbol-based mapping based on the mapping parameters and that may be implemented as an application specific integrated circuit (ASIC) hardware accelerator.

Figure 2:
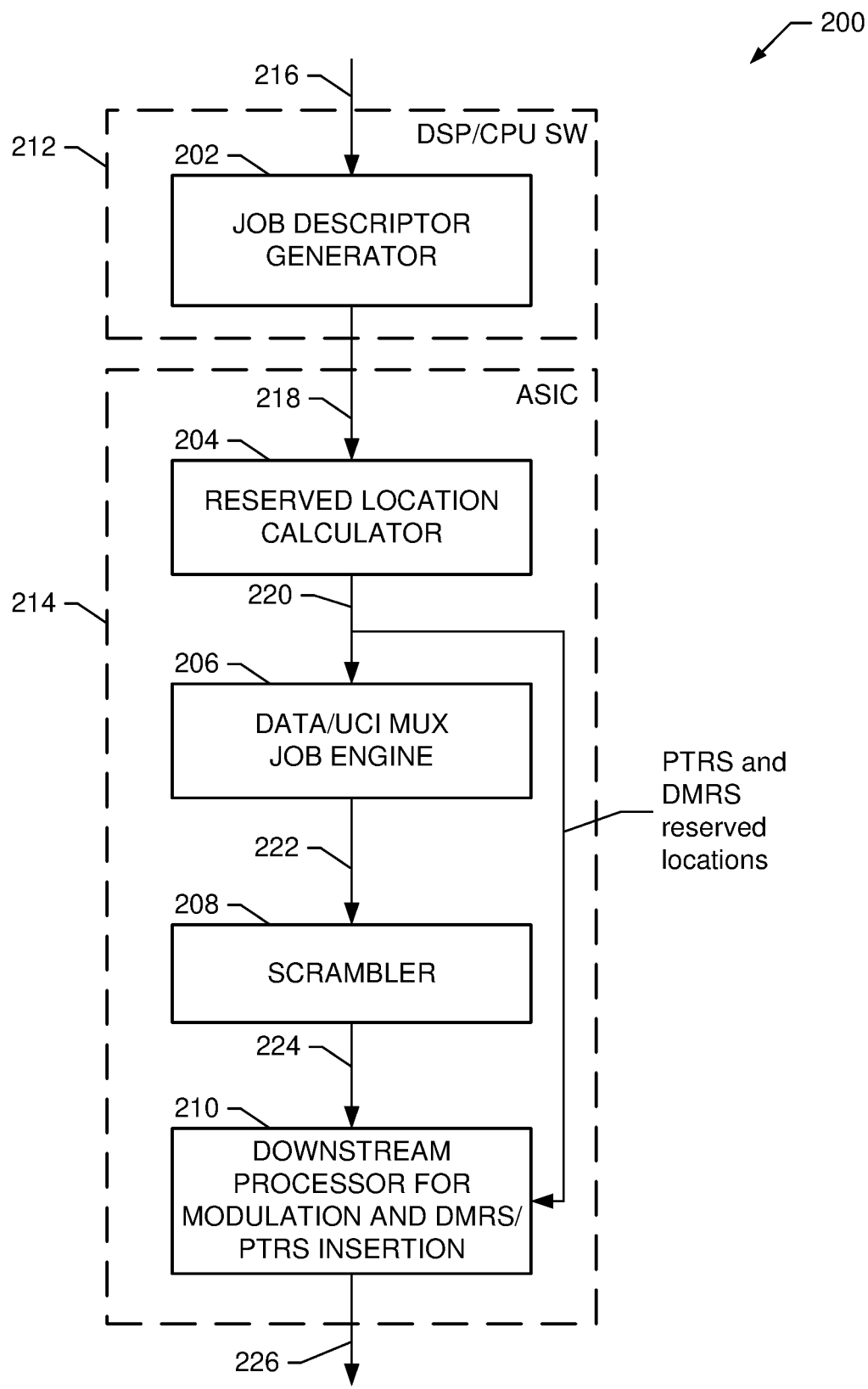
FIG. 2 is a block diagram illustrating an exemplary embodiment of a multiplexer in accordance with embodiments of the present invention.

FIG. 2 is a block diagram of a multiplexing system 200 constructed in accordance with embodiments of the present invention. For example, the multiplexing system 200 is suitable for use as the multiplexing system 152 shown in FIG. 1. In an embodiment, the multiplexing system 200 comprises a job description generator 202, reserved location calculator 204, Data/UCI multiplexing job engine 206, scrambler 208, and downstream processor 210 for modulation and DMRS/PTRS insertion. In an embodiment, the job descriptor generator 202 is implemented by DSP/CPU software (SW) 212 and the reserved location calculator 204, job engine 206, scrambler 208, and downstream processor 210 are implemented by ASIC 214.

In an embodiment, the job descriptor generator 202 operates to calculate the {d, m_re} for {ack/ack_rsvd, csi1 csi2} in each symbol based on the steps shown above. The job descriptor generator 202 also maintains a {cur_offset}, which is the current offset with a 64-bit word of the bit streams for each of {ack, csi1, csi2, data} for each symbol. The parameters 218 generated by the job descriptor generator 202 are passed to the reserved location calculator 204.

In an exemplary embodiment, to map the encoded ACK, CSI_part1, CSI_part2 and UL-SCH data bits correctly to the NR resource grid, the locations for the reference symbols should be skipped. This is because the UCI and data multiplexing specified above is only for the set of resource elements available for the data or UCI transmission in each symbol l, as denoted by $\Phi_l$ for l=0, 1, 2, ..., $N_{symb,all}^{PUSCH}$ - 1. As such, the resource elements that are reserved by PTRS and DMRS should be calculated in the resource grid and be excluded from the UCI/data multiplexing. If the UCI/data multiplexing is done completely without the reference symbols' location, it would require one or more extra buffers to store the intermediate bits, and would also introduce extra latency in the separate processing.

In an exemplary embodiment, the reserved location calculator 204 calculates the reserved locations for PTRS or DMRS for each symbol based on known tables of frequency mapping of PTRS and DMRS, thereby avoiding the need for extra buffers and the associated processing latency. For example, based on the parameters 218 received from the job descriptor generator 202, the reserved location calculator 204 calculates the symbol level reserved location of the reference symbols. The locations of the reference symbols will be marked with 1-bit masking bit and the UCI and UL-SCH data are not multiplexed into these reserved resource elements. These bit-masking patterns will then serve as indicators for the later insertion of the PTRS or DMRS in each OFDM symbol prior to uplink transmission.

In an embodiment, the reserved location calculator 204 calculate PTRS bit-masking for both CP-OFDM mode and DFT-s-OFDM mode. For example, in an embodiment, the reserve location calculator 204 calculates the reserved locations for PTRS and DMRS for each symbol based on the following tables of frequency mapping of PTRS and DMRS.

PTRS CP-OFDM

Table 1 gives the physical allocation calculation for the PTRS in CP-OFDM mode based on the given the configuration parameters. For each of the RE locations that are reserved for the PTRS, a masking bit is marked to avoid a write of the UCI and data bits in those reserved RE locations.

TABLE 1

The Physical Allocation table for the PTRS in CP-OFDM mode

| ab_cfg params | | | | | |
|---|---|---|---|---|---|
| Rs_cat | Rs_mapping_type | Other Params | Name | PTRS Type | RE Index k of PTRS samples in OFDM symbol $k < M_{sc}^{PUSCH}$ |
| 0 | 0 | $M_{sc}^{PUSCH}$ | num_re_pusch | Distributed | $k - k_{ref}^{RE}[i] + 12(sK_{PTRS} + k_{ref}^{RB})$ where s = 0, 1, ... |
| | | $k_{ref}^{RB}$ | ptrs_dist_rb_offset | | $k_{ref}^{RB} \in \{0, ..., K_{PTRS} 1\}$ |
| | | $K_{PTRS}$ | ptrs_dist_rb_step | | $K_{PTRS} \in \{2, 4\}$, |
| | | $k_{ref}^{RE}[6]$ | ptrs_dist_re_offset [6] | | $k_{ref}^{RE}[i] \in \{0, ..., 11\}$ valid for |

TABLE 1-continued

The Physical Allocation table for the PTRS in CP-OFDM mode

| | ab_cfg params | | | | |
|---|---|---|---|---|---|
| Rs_cat | Rs_mapping_type | Other Params | Name | PTRS Type | RE Index k of PTRS samples in OFDM symbol $k < M_{sc}^{PUSCH}$ |
| 0 | 1 | ptrs_num_ports $M_{sc}^{PUSCH}$ | ptrs_dist_num_ports num_re_pusch | Localized (Rel 16) | $i = 0, 1, \ldots,$ num ports ptrs − 1<br>This is given by SW according to the Table 6.4.1.2.2.1-1.<br>num_ports_ptrs ∈ [1, 6]<br>$k = s + k\_i$<br>where<br>$\begin{cases} s = \text{ptrs\_loc\_re\_offset}[0] \text{ and} \\ k\_i = 0, 1, \ldots, \text{ptrs\_loc\_re\_lenth}[0] - 1 \\ s = \text{ptrs\_loc\_rc\_offset}[0] \text{ and} \\ k\_i = 0, 1, \ldots, \text{ptrs\_loc\_re\_length}[1] - 1 \end{cases}$ |
| | | ptrs_loc_re_offset[2] ptrs_loc_re_length[2] | ptrs_loc_re_offset[2] ptrs_loc_re_length[2] | | ptrs_loc_re_offset[i] ∈ {0, . . . , 3299}<br>ptrs_loc_re_length [0] ∈ {1, . . . , 511}<br>ptrs_loc_re_length [1] ∈ {0, . . . , 511} |

Table 1 is considered where, $k_{ref}^{RE}[\text{num\_ports\_ptrs}]$ shall be in sequential order. i.e. $k_{ref}^{RE}[i] < k_{ref}^{RE}[i+1]$, ptrs_loc_re_offset[2] shall be in sequential order. i.e. offset[0]<offset[1], and ptrs_loc_re_length[1]=0 means 'disable' for the given $2^{nd}$ burst.

PTRS DFTs-OFDM

Table 2 provides the configuration parameters and the calculation procedure for the PTRS allocations in DFT-s-OFDM mode. Each row is referring to one case with a different number of PTRS groups and number of samples per PTRS group.

TABLE 2

Frequency Allocation for the PTRS in DFTs-OFDM mode.

| Params from AB_CFG | | | Number of PT-RS groups $N_{group}^{PTRS}$ | Number of samples per PT-RS group $N_{samp}^{group}$ | Index m of PT-RS samples in OFDM symbol $m < M_{sc}^{PUSCH}$ |
|---|---|---|---|---|---|
| rs_cat | rs_mapping_type | Others | | | |
| 1 | 0 | $M_{sc}^{PUSCH}$ | 2 | 2 | $m = sM_{sc}^{PUSCH}/4 + k - 1$ where $s = 1, 3$ and $k = 0, 1$ |
| 1 | 1 | $M_{sc}^{PUSCH}$ | 2 | 4 | $m = sM_{sc}^{PUSCH} + k$ where $\begin{cases} s = 0 \text{ and } k = 0, 1, 2, 3 \\ s = 1 \text{ and } k = -4, -3, -2, -1 \end{cases}$ |
| 1 | 2 | $M_{sc}^{PUSCH}$ | 4 | 2 | $m = \lfloor sM_{sc}^{PUSCH}/8 \rfloor k - 1$ where $s = 1, 3, 5, 7$ and $k = 0, 1$ |
| 1 | 3 | $M_{sc}^{PUSCH}$ | 4 | 4 | $m = sM_{sc}^{PUSCH}/4 + n + k$ where<br>$\begin{cases} s = 0 & \text{and } k = 0, 1, 2, 3 & n = 0 \\ s = 1, 2 & \text{and } k = -2, -1, 0, 1 & n = \lfloor M_{sc}^{PUSCH}/8 \rfloor \\ s = 4 & \text{and } k = -4, -3, -2, -1 & n = 0 \end{cases}$ |
| 1 | 4 | $M_{sc}^{PUSCH}$ | 8 | 4 | $m = \lfloor sM_{sc}^{PUSCH}/8 \rfloor + n + k$ where<br>$\begin{cases} s = 0 & \text{and } k = 0, 1, 2, 3 & n = 0 \\ s = 1, 2, 3, 4, 5, 6 & \text{and } k = -2, -1, 0, 1 & n = \lfloor M_{sc}^{PUSCH}/16 \rfloor \\ s = 9 & \text{and } k = -4, -3, -2, -1 & n = 0 \end{cases}$ |

TABLE 2-continued

Frequency Allocation for the PTRS in DFTs-OFDM mode.

| Params from AB_CFG | | | Number of PT-RS groups $N_{group}^{PTRS}$ | Number of samples per PT-RS group $N_{samp}^{group}$ | Index m of PT-RS samples in OFDM symbol $m < M_{sc}^{PUSCH}$ |
|---|---|---|---|---|---|
| rs_cat | rs_mapping_type | Others | | | |
| 1 | 5 | $M_{sc}^{PUSCH}$ $\Delta$ | 1 | 16 | $m = \lfloor sM_{sc}^{PUSCH}/32 \rfloor + \Delta - 1$ where $s = 1, 3, 5, 7, 9, 11, 13, 15, 17, 19, 21, 23, 25, 27, 29, 31$ and $\Delta$ F $\{0, 1\}$ |

Table 2 is considered where $M_{sc}^{PUSCH}$=num_re_pusch, $\Delta$=ptrs_dft_s_ofdm_delta, and Pi/2 BPSK is not supported for rs_cat=1 and rs_type=5.

DMRS Bit Masking for CP-OFDM Mode

Table 3 shows the frequency allocations for DMRS in the CP-OFDM operating mode for each symbol.

TABLE 3

DMRS frequency allocation for the DMRS in CP-OFDM case.

| AB_CFG params | | | DMRS Config Type | Index m of DM-RS samples in OFDM symbol $m < M_{sc}^{PUSCH}$ |
|---|---|---|---|---|
| rs_cat | rs_mapping_type | others | | |
| 2 | 0 | $M_{sc}^{PUSCH}$ | 1 | $m = 2s$ where $s = 0, 1, \ldots$ |
| 2 | 1 | $M_{sc}^{PUSCH}$ | 1 | $m = 2s + 1$ where $s = 0, 1, \ldots$ |
| 2 | 2 | $M_{sc}^{PUSCH}$ | 2 | $m = 6s + k$ where $s = 0, 1, \ldots$ and $k = 0, 1$ |
| 2 | 3 | $M_{sc}^{PUSCH}$ | 2 | $m = 6s + k$ where $s = 0, 1, \ldots$ and $k = 2, 3$ |
| 2 | 4 | $M_{sc}^{PUSCH}$ | 2 | $m = 6s + k$ where $s = 0, 1, \ldots$ and $k = 4, 5$ |
| 2 | 5 | $M_{sc}^{PUSCH}$ | 2 | $m = 6s + k$ where $s = 0, 1, \ldots$ and $k = 0, 1, 2, 3$ |
| 2 | 6 | $M_{sc}^{PUSCH}$ | 2 | $m = 6s + k$ where $s = 0, 1, \ldots$ and $k = 0, 1, 4, 5$ |
| 2 | 7 | $M_{sc}^{PUSCH}$ | 2 | $m = 6s + k$ where $s = 0, 1, \ldots$ and $k = 2, 3, 4, 5$ |

In an embodiment, the reserved location calculator 204 provides an output 220 to the job engine 206 that includes at least a portion of the parameters 218 and the reserved locations for PTRS or DMRS for each symbol.

In an embodiment, the job engine 206 operates to multiplex the UCI and data into symbol REs while avoiding reserved RS locations based on the intermediate parameters 218 of each symbol determined by the job descriptor generator 202 and the reserved locations for PTRS or DMRS for each symbol determined by the job engine 206. In an exemplary embodiment, the job engine 206 determines the multiplexing of the UCI and data bits for each rs_cat and rs_mapping_type with the associated ab_cfg parameters for each symbol. After the operation of the job engine 206, symbol REs 222 having multiplexed UCI and data are input to the scrambler 208.

In an embodiment, the scrambler 208 operates to receive the symbol REs 222 and scramble the data and control bits. For example, the scrambling process can be done based on scrambling procedures outlined in the 3GPP specification. In an embodiment, the scrambler outputs scrambled bits 224 that may also include data/control bits, masking bits for REs reserved for PTRS/DMRS, masking bits for CRC REs, and scrambling code state information associated with a linear feedback shift register (LFSR).

In an embodiment, the downstream processor 210 receives the scrambled bits 224 and other information and operates to modulate the data and control REs, and insert the DMRS or PTRS in the reserved locations masked by the reserved location calculator 204. The downstream processor 210 then outputs the multiplexed symbol 226 for transmission.

Figure 3A:
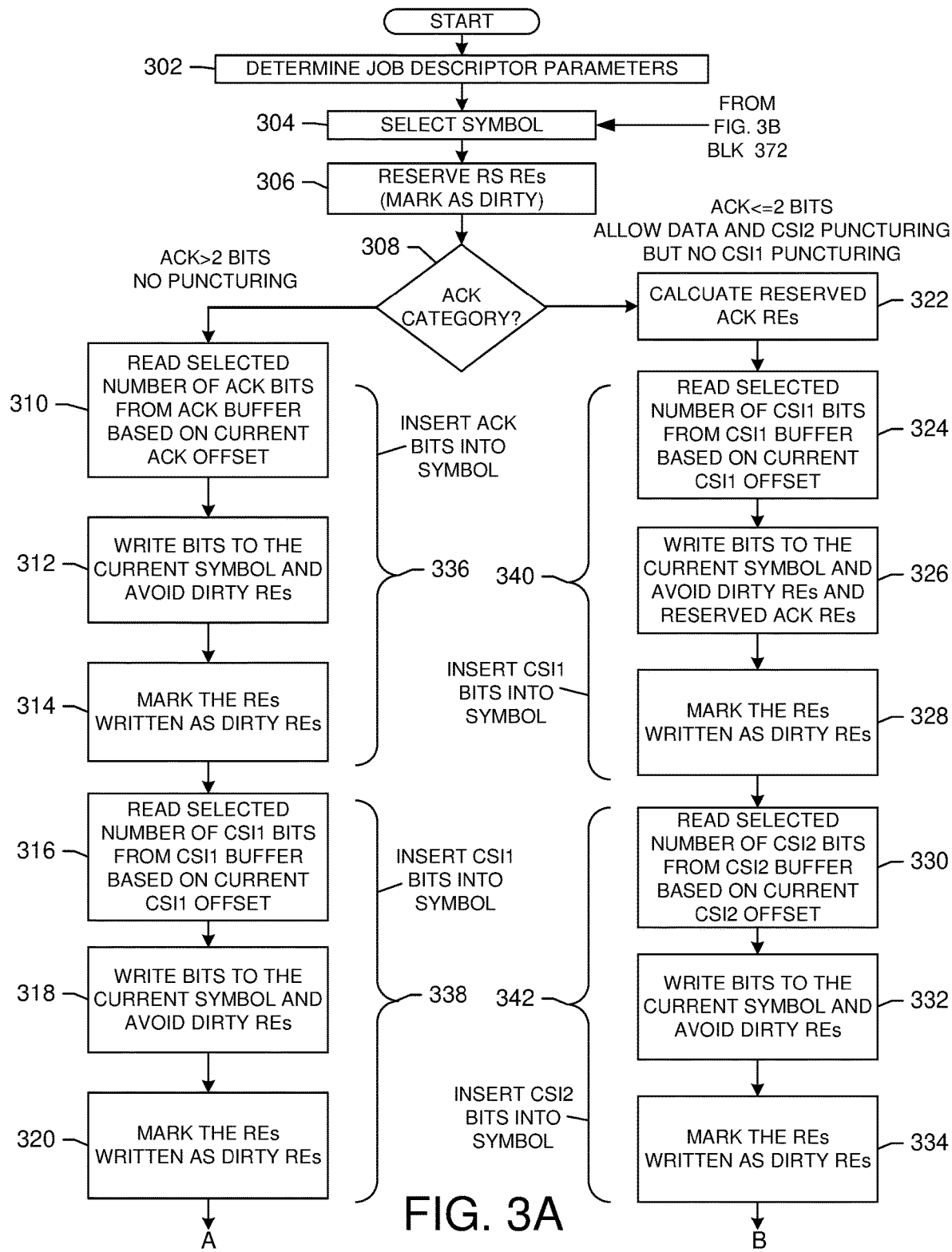
FIGS. 3A-B show a method for multiplexing UCI and data bit streams in accordance with embodiments of the present invention.
Figure 3B:
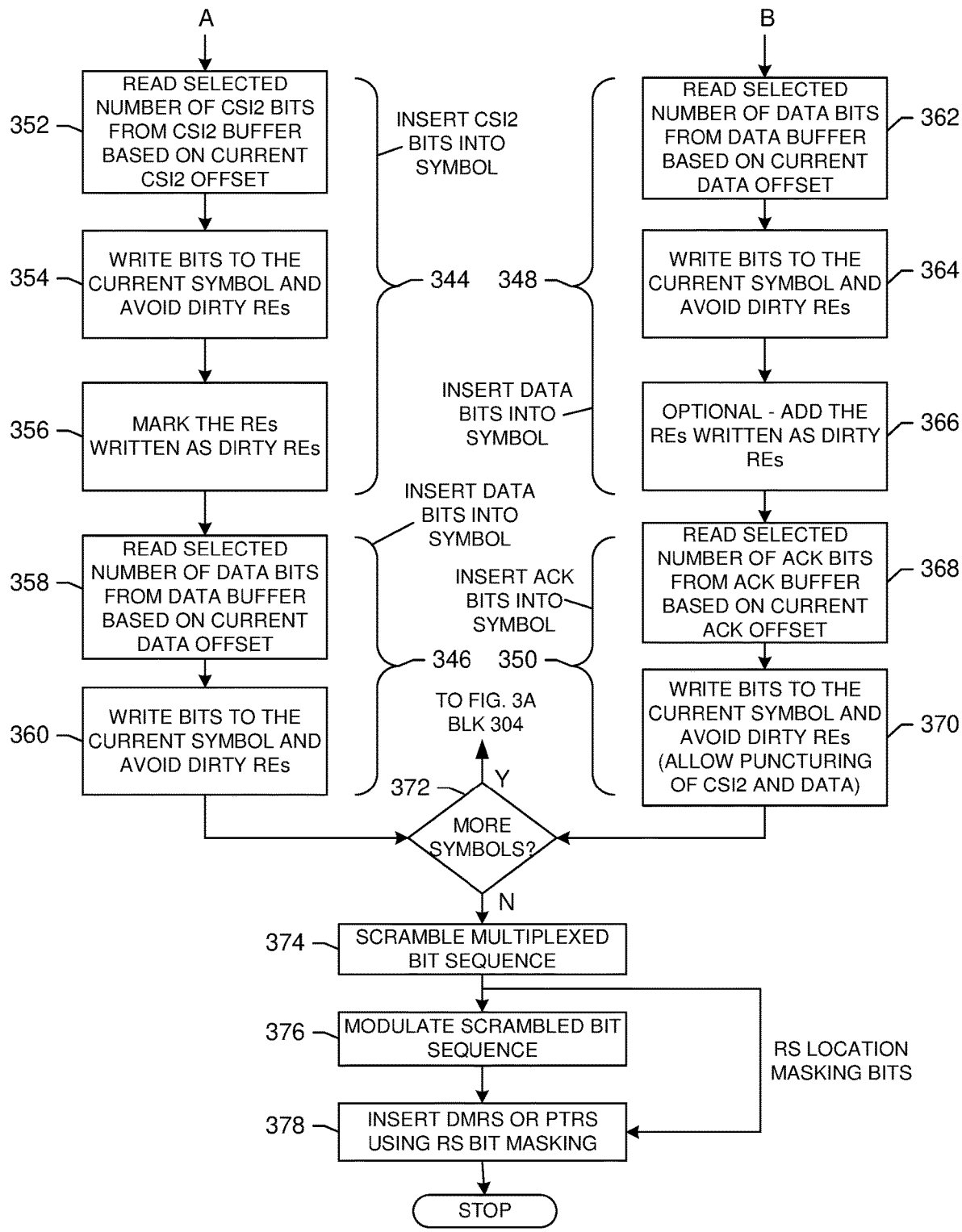

FIGS. 3A-B show a method 300 for multiplexing UCI and data bit streams in accordance with embodiments of the present invention. FIG. 4 shows a diagram 400 that is used to describe the operations of the method 300. The diagram 400 shows ACK buffer 402 that stores ACK values, CSI1 buffer 404 that stores CSI1 values, data buffer 406 that stores data values, and CSI2 buffer 408 that stores CSI2 values. Pointers are also shown that point to values in each buffer. The diagram 400 also shows four symbols (0-3) where each symbol includes a column of resource elements 410 and a column of indicators 412 that indicate if a particular RE is used (e.g., dirty or reserved). The diagram 400 also shows parameter names 416. For the four symbols (0-3) corresponding parameters 418, 420, 422, and 424 are shown that are used to multiplex UCI and data into each symbol. It should be noted that the diagram 400 illustrates exemplary operation of the method 300 and that based on the determined parameters, adjustments, changes or modifications may be performed.

Referring now to FIG. 3A the method 300 begins at block 302. In an embodiment, the method 300 is suitable for use with the multiplexing system 200 shown in FIG. 2.

At block 302, job descriptor parameters are determined. For example, the following job descriptor parameters are determined (rs_rsv_re_pars{num_re_pusch, rb_offset_ptrs, rb_step_ptrs, rs_cat, rs_mapping_type . . . etc}ack_rsv_re_pars{d_re_ack_rsv, m_re_ack_rsv etc, ack_cat}, {d_re_csi1, m_re_csi1, cur_offset_csi1}; {d_re_csi2, m_re_csi2, cur_offset_csi2}; {m_re_data, cur_offset_data}; {d_re_ack, m_re_ack, cur_offset_ack}, {num_layer, q_m etc}. In an embodiment, the ds and m_res and current data pointers are calculated in according to 3GPP standard (e.g., 38.212 section 6.2.7. [e.g., Scrambling pars {scrambling cinit or lfsr}]). In an embodiment, the job descriptor generator 202 determines the job descriptor parameters At block 304, a symbol is selected in which multiplexed UCI and data may be written. For example, referring to FIG. 4, the symbol 0 is selected. The parameters 418 associated with symbol 0 and will be used to determine which UCI and data are multiplexed into symbol 0. In an embodiment, the reserved location calculator 204 makes the symbol selection.

At block 306, reserved resource elements (REs) are determined and marked as dirty. In an embodiment, RS{PTRS or DMRS} REs are reserved. In one example, they are marked as rs_re_dirty{dmrs or ptrs}. The locations are calculated from the simple parameters as in the tables of PTRS and DMR allocations. For example, as illustrated in FIG. 4, the locations of the PTRS RE in symbol 1 are marked as dirty (d) as indicated by 414. For example, the ptrs_re_mask bits (0x18) for symbol 1 identify the locations of the reference RE in symbol 1 to be masked. However, with respect to symbol 0, the parameter ptrs_re_mask (e.g., parameters 418) indicates that there are no reference REs in symbol 0 to be masked. In an embodiment, the reserved location calculator 204 determines if reference REs are to be masked in the current symbol from the ptrs_re_mask parameter associated with that symbol.

At block 308, a determination is made as to the ACK category based on the number of ACK bits. If the number of ACK bits is greater than 2 bits, the method proceeds to block 310. If the number of ACK bits is less than or equal to 2 bits, the method proceeds to block 322. For example, if the number of ACK bits>2 bits, multiplexing of UCI and data is performed beginning at block 310 such that the ACK bits will not overwrite other bits. If the number of ACK bits<=2 bits, multiplexing of UCI and data is performed beginning at block 322 such that it is possible that the ACK bits will overwrite (puncture) both the CSI2 and data bits.

The section 336 includes operations at blocks 310, 312, and 314 that insert ACK bits into a symbol.

At block 310, a selected number of ACK bits are read from an ACK buffer based on a current ACK offset. For example, m_re_ack number of REs ((Nl*Qm) ACK bits) are read from the current offset (cur_offset_ack) from the ACK buffer 402 based on the parameters 418 for symbol 0. For example, the cur_ack_ptr is 0 and the number of ACK values to read is m_re_ack, which is 12. In an embodiment, the job engine 206 analyzes the parameters 418 and performs this read operation.

At block 312, the bits that were read at block 310 are written to the current symbol based on d_ack for m_re_ack REs and dirty REs indicated by a (d) are avoided. For example, if there are any reserved RE, they are avoided when the ACK bits are written. From the parameters 418, the parameter d_ack indicates the number of REs between ACK writes, the parameter m_re_ack indicates the number of ACK REs to write. The parameter ptrs_re_mask provides a bit mask that indicates the location of any reserved REs to be used for PTRS or DMRS values. In this case, there are no reserved RS REs in symbol 0. In an embodiment, the job engine 206 performs this write operation by writing 12 ACK values into REs of symbol 0 as shown in FIG. 4.

At block 314, the REs written by the job engine 206 into the symbol are marked as dirty REs (rs_ack_dirty). For example, the column 412 includes bit indicators for each RE that indicate when a value is written into that RE. After writing all the ACK values into the symbol 0, all the indicators 412 are set to (d) indicate used or dirty REs for that symbol. In an embodiment, the job engine 206 marks the written REs as dirty (e.g., sets the appropriate bit in column 412).

The section 338 includes operations at blocks 316, 318, and 320 that multiplex CSI1 bits into a symbol. The operations to multiplex the CSI1 bits into the symbols is similar to the operations of section 336 described above to multiplex the ACK bits.

At block 316, a selected number of CSI1 bits are read from the CSI1 buffer 404 based on a current CSI1 offset. For example, m_re_csi1 number of REs ((Nl*Qm) CSI1 bits) are read from the current CSI1 offset (cur_offset_csi1) from the CSI1 buffer 404. In an embodiment, the job engine 206 performs this read operation.

At block 318, the bits that were read at block 316 are written to the current symbol based on d_csi1 for m_re_csi1 REs and dirty REs are avoided. For example, if there are any reserved RE, they are avoided when the CSI1 bits are written. In this case, all the available REs in symbol 0 have been marked as dirty due to the insertion of the ACK bits. Therefore, no CSI1 bits will be written to the symbol 0. In an embodiment, the job engine 206 determines whether or not to perform this write operation.

At block 320, the REs written are marked as dirty REs (rs_ack_csi1_dirty). For example, no REs have been written with CSI1 bits in symbol 0 so all REs in symbol 0 are already marked as dirty. In an embodiment, the job engine 206 determines whether or not to mark any REs as dirty.

The method then proceeds to reference A in FIG. 3B to perform section 344 that includes operations at blocks 352, 354, and 356 that multiplex CSI2 bits into a symbol. The operations to multiplex the CSI2 bits into the symbols is similar to the operations of section 338 described above to multiplex the CSI1 bits.

At block 352, a selected number of CSI2 bits are read from the CSI2 buffer 408 based on a current CSI2 offset. For example, m_re_csi2 number of REs ((Nl*Qm) CSI2 bits) are read from the current offset (cur_offset_csi2) from the CSI2 buffer 408. In an embodiment, the job engine 206 performs this read operation.

At block 354, the bits that were read at block 352 are written to the current symbol based on d_csi2 for m_re_csi2 REs and avoid dirty REs (re_csi2_dirty). For example, if there are any REs marked dirty, they are avoided when the CSI2 bits are written. In this case, all the available REs in symbol 0 have been marked as dirty due to the insertion of the ACK bits. Therefore, no CSI2 bits will be written to the symbol 0. In an embodiment, the job engine 206 determines whether or not to perform this write operation.

At block 356, the REs written by CSI2 are marked as dirty REs (rs_csi1_csi2_dirty) for all REs. For example, no REs have been written with CSI2 bits in symbol 0 so all REs in symbol 0 are already marked as dirty. In an embodiment, the job engine 206 determines whether or not to mark any REs as dirty.

The method then proceeds to perform section 346 that includes operations at blocks 358 and 360 that multiplex data bits into a symbol. The operations to multiplex the data bits into the symbols is similar to the operations of section 338 described above to multiplex the CSI1 bits.

At block 358, a selected number of data bits are read from the data buffer 406 based on a current data offset. For example, m_re_data number of REs ((Nl*Qm) data bits) are read from the current offset (cur_offset_data) from the data buffer 406. In an embodiment, the job engine 206 performs this read operation.

At block 360, the REs that were read at block 358 are written to the current symbol for m_re_data REs and dirty REs indicated by (d) are avoided. For example, if there are any REs marked dirty, they are avoided when the data bits are written. In this case, all the available REs in symbol 0 have been marked as dirty due to the insertion of the ACK bits. Therefore, no data bits will be written to the symbol 0. In an embodiment, the job engine 206 determines whether or not to perform this write operation.

At block 372, a determination is made as to whether there are additional symbols in which UCI and data are to be multiplexed. If there are additional symbols, the method proceeds to block 304 shown in FIG. 3A. If there are not additional symbols, the method proceeds to block 374.

Symbol 1

It will be assumed there are additional symbols, such as symbols 1-3 shown in FIG. 4. The method returns to block 304 where the next symbol is selected (e.g., Symbol 1). The method proceeds to the operations in section 336.

In section 336, blocks 310, 312, and 314 read ACK bits from the ACK buffer 402 and write those bits to REs in symbol 1. However, the dirty (reserved) symbols for PTRS and DMRS are avoided. The ACK bits are written according to the parameters 420. The parameters 420 indicated that 8 ACK values from current ACK pointer 12 will be written into symbol 1 with a spacing of 1. The mask bits (ptrs_re_mask) are 0x18 which indicates that the reserved REs 414 are to be skipped or avoided during the ACK write. After the ACK values are written into symbol 1, those written REs are marked as dirty (not shown in FIG. 4). The method then proceeds to section 338.

In section 338, blocks 316, 318, and 320 read CSI1 bits from the CSI1 buffer 404 and write those bits to REs in symbol 1. However, the dirty (reserved) REs for PTRS and DMRS are avoided, and so are the dirty REs that contain ACK values. The CSI1 bits are written into available REs in symbol 1. As illustrated in FIG. 4, CSI1_0 and CSI1_1 are written into the two available REs in symbol 1. After the write operation, those REs are marked as dirty. The method then proceeds to section 334.

In section 334, blocks 352, 354, and 356 read CSI2 bits from the CSI2 buffer 408 and write those bits to REs in symbol 1. However, the dirty (reserved) REs for PTRS and DMRS are avoided, and so are the dirty REs that contain ACK and CSI1 values. Since there are no REs available in symbol 1, no CSI2 values are written to symbol 1. The method then proceeds to section 346.

In section 346, blocks 358 and 360 read data bits from the data buffer 406 and write those bits to REs in symbol 1. However, the dirty (reserved) REs for PTRS and DMRS are avoided, and so are any dirty REs that contain ACK, CSI1, and CSI2 values. Since there are no REs available in symbol 1, no data values are written to symbol 1. The method then proceeds to block 372.

At block 372, a determination is made as to whether there are additional symbols in which UCI and data are to be multiplexed. If there are additional symbols, the method proceeds to block 304 shown in FIG. 3A. If there are not additional symbols, the method proceeds to block 374.

Symbol 2

It will be assumed there are additional symbols, such as symbols 1-3 shown in FIG. 4. The method returns to block 304 where the next symbol is selected (e.g., Symbol 2). The method proceeds to the operations in section 336.

In section 336, blocks 310, 312, and 314 read ACK bits from the ACK buffer 402 and write those bits to REs in symbol 2. However, the dirty (reserved) symbols for PTRS and DMRS are avoided. The ACK bits are written according to the parameters 422. However, parameters 422 indicate that no ACK bits are to be written in symbol 2. The method then proceeds to section 338.

In section 338, blocks 316, 318, and 320 read CSI1 bits from the CSI1 buffer 404 and write those bits to REs in symbol 2. However, the dirty (reserved) REs for PTRS and DMRS are avoided, and so are the dirty REs that contain ACK values. The CSI1 bits are written into available REs in symbol 2. As illustrated in FIG. 4, CSI1_2, CSI1_3, CSI1_4, and CSI1_5 are read from the CSI1 buffer 404 and written into the available REs in symbol 2. For example, the CSI1 bits are written with a spacing of 3 REs, which is indicated by the d_csi1 parameter. For example, for each bit stream, a set of two parameters work together, the parameter m_re_xxxbits indicates how many REs are for these bits, and parameter d_xxxbits indicates the RE gap between the consecutive writes. After the write operation, those REs are marked as dirty. The method then proceeds to section 334.

In section 334, blocks 352, 354, and 356 read CSI2 bits from the CSI2 buffer 408 and write those bits to REs in symbol 2. However, the dirty (reserved) REs for PTRS and DMRS are avoided, and so are the dirty REs that contain ACK and CSI1 values. As illustrated in FIG. 4, CSI2_0, CSI2_1, and CSI2_2 are read from the CSI2 buffer 408 and written into the available REs in symbol 2. For example, the CSI2 bits are written with a spacing of 3 REs, which is indicated by the d_csi2 parameter. The method then proceeds to section 346.

In section 346, blocks 358 and 360 read data bits from the data buffer 406 and write those bits to REs in symbol 2. However, the dirty (reserved) REs for PTRS and DMRS are avoided, and so are any dirty REs that contain ACK, CSI1, and CSI2 values. As illustrated in FIG. 4, data_0, data_1, data_2, data_3, and data_4 are read from the data buffer 406 and written into the available REs in symbol 2. For example, the data bits are always written with a spacing of 1 REs by skipping all the REs that are marked dirty. The method then proceeds to block 372.

At block 372, a determination is made as to whether there are additional symbols in which UCI and data are to be multiplexed. If there are additional symbols, the method proceeds to block 304 shown in FIG. 3A. If there are not additional symbols, the method proceeds to block 374.

Symbol 3

It will be assumed there are additional symbols, such as symbols 1-3 shown in FIG. 4. The method returns to block 304 where the next symbol is selected (e.g., Symbol 3). The method proceeds to the operations in section 336.

In section 336, blocks 310, 312, and 314 read ACK bits from the ACK buffer 402 and write those bits to REs in symbol 3. However, the dirty (reserved) symbols for PTRS and DMRS are avoided. The ACK bits are written according to the parameters 422. However, parameters 422 indicate that no ACK bits are to be written in symbol 3. The method then proceeds to section 338.

In section 338, blocks 316, 318, and 320 read CSI1 bits from the CSI1 buffer 404 and write those bits to REs in symbol 2. However, the dirty (reserved) REs for PTRS and DMRS are avoided, and so are the dirty REs that contain ACK values. As illustrated in FIG. 4, all CSI1 bits have been written to symbol 2. Thus, there are no CSI1 bits to write into symbol 3. The method then proceeds to section 334.

In section 334, blocks 352, 354, and 356 read CSI2 bits from the CSI2 buffer 408 and write those bits to REs in symbol 3. However, the dirty (reserved) REs for PTRS and DMRS are avoided, and so are the dirty REs that contain ACK and CSI1 values. As illustrated in FIG. 4, all CSI2 bits have been written to symbol 2. Thus, there are no CSI2 bits to write into symbol 3. The method then proceeds to section 346.

In section 346, blocks 358 and 360 read data bits from the data buffer 406 and write those bits to REs in symbol 2. However, the dirty (reserved) REs for PTRS and DMRS are avoided, and so are any dirty REs that contain ACK, CSI1, and CSI2 values. As illustrated in FIG. 4, data_5 through data_16 are read from the data buffer 406 and written into the available REs in symbol 3. For example, the data bits are written with a spacing of 1 REs. The method then proceeds to block 372.

At block 372, a determination is made as to whether there are additional symbols in which UCI and data are to be multiplexed. If there are additional symbols, the method proceeds to block 304 shown in FIG. 3A. If there are not additional symbols, the method proceeds to block 374.

At block 374, the multiplexed bit sequence is scrambled. For example, in an embodiment, the ACK locations and $Q_m$ are used to determine the scrambling of ACK under the 3GPP standard (e.g., section 6.3.1.1 or 38.211). Then state information is reported to LFSR.

At block 376, modulation of the scrambled sequence is performed. For example, in an embodiment, the CRC masking bits are used to null the CRC failed REs At block 378, insertion of DMRS or PTRS is performed. For example, in an embodiment, DMRS or PTRS are inserted based on the RS bit masking as it appears in symbol 1. The symbols can then be processed for transmission.

In another embodiment, the number of ACK bits is less than or equal to 2. In this case, the method proceeds from block 308 to block 322 to multiplex UCI and data.

At block 322, a parameter RVD_ACK_RE is calculated assuming 2-bit ACK transmission from {d_re_ack_rsv, m_re_ack_rsv}. This parameter marks REs reserved for ACK bits. The method then proceeds to section 340.

In section 340, blocks 324, 326, and 328 read CSI1 bits from the CSI1 buffer 404 and write those bits to REs in the symbol. However, the dirty (reserved) REs for PTRS and DMRS and reserved ACK REs are avoided. The REs that are written are marked as dirty. The method then proceeds to section 342.

In section 342, blocks 330, 332, and 334 read CSI2 bits from the CSI2 buffer 408 and write those bits to REs in the symbol. However, the dirty (reserved) REs for PTRS and DMRS are avoided, and so are the dirty REs that contain CSI1 values. The REs that are written are marked as dirty. The method then proceeds to section 348.

In section 348, blocks 362, 364, and 366 read data bits from the data buffer 406 and write those bits to REs in the symbol. However, the dirty (reserved) REs for PTRS and DMRS are avoided, and so are any dirty REs. The REs that are written are marked as dirty. It should be noted that in an embodiment, writing the CSI2 and data bits ignores the reserved ACK locations. Both CSI2 and data can be overwritten by ACK bits in section 350. This is different from CSI1 bits that are written into locations to avoid both dirty REs and the reserved ACK locations. The method then proceeds to section 350.

In section 350, blocks 368 and 370 read ACK bits from the ACK buffer 402 and write those bits to REs in the symbol. However, the dirty (reserved) REs for PTRS and DMRS and CSI1 are avoided. However, puncturing of CSI2 and data REs is allowed. The REs that are written are marked as dirty. The method then proceeds to block 372 to process any additional symbols in the same manner as above.

Thus, the method 300 operates to multiplex UCI and data into symbols in accordance with the various exemplary embodiments.

Job Description Parameters

The following is an exemplary table of job description parameters generated by the job description generator 202 shown in FIG. 2.

| Parameter | Range | Bitwidth | Comment |
| --- | --- | --- | --- |
| rs_insertion_enable | {0, 1} | 1 | RS Insertion Enable/Disable<br>0: Disable (all RS insertion related parameters are ignored)<br>1: Enable |
| rs_cat | {0, 1, 2} | 2 | Category type for the reference symbols (RS):<br>0: PTRS for CP-OFDM<br>1: PTRS for DFT-s-OFDM<br>2: DMRS for CP-OFDM |
| rs_mapping_type | [0, 1, 2, 3, 4, 5, 6, 7] | 3 | Mapping type for each RS Category<br>Value range depends on different rs_cat.<br>For rs_cat = 0 (PTRS for CP-OFDM mode):<br>Table 1<br>0: distributed PTRS<br>1: localized PTRS<br>For rs_cat = 1 (PTRS for DFT-s-OFDM):<br>Table 2<br>[0, 5]<br>For rs_cat = 2 (DMRS for CP-OFDM):<br>Table 3<br>[0, 7] |
| num_rb_pusch | [1, 275] | 9 | Number of RBs allocated for PUSCH channel.<br>PTRS, DMRS, and UCI as well as data are allocated to these RBs according to the frequency allocation pattern for each data source. |

-continued

| Parameter | Range | Bitwidth | Comment |
|---|---|---|---|
| ptrs_dist_rb_offset | [0, 3] | 2 | $k_{ref}^{RB}$, RB offset of the PTRS allocation for the CP-OFDM case. $k_{ref}^{RB} \in \{0, \ldots, K_{PTRS} - 1\}$ |
| ptrs_dist_rb_step | {2, 4} | 4 | $K_{PTRS}$, RB Step of PTRS allocation for CP-OFDM case $K_{PTRS} \in \{2, 4\}$ |
| ptrs_dist_re_offset[6] | [0, 11] | 6*4 | $k_{ref}^{RB}[i]$, RE Offset of the PTRS for CP-OFDM case for each antenna port. This is given by SW according to the Table 6.4.1.2.2.1-1. $k_{ref}^{RB}[i] \in \{0, \ldots, 11\}$ valid for i = 0, 1, . . . , num_dist_ports_ptrs − 1 |
| ptrs_dist_num_ports | [1, 6] | 3 | The total number of antenna ports in the CP-OFDM case. It is only valid for CP-OFDM. ptrs_dist_num_ports $\in$ [1, 6] |
| ptrs_loc_re_offset[2] | [0, 3299] | 12*2 | This is the offset of REs for each group of PTRS insertion in the case of localized allocation. This is only valid for R16 of CP-OFDM. ptrs_loc_re_offset[i] $\in \{0, \ldots, 3299\}$, ptrs_loc_re_offset[1] > ptrs_loc_re_offset[0] |
| ptrs_loc_re_length[2] | [0, 511] | 9*2 | RE Length in each burst of PTRS for localized PTRS allocation in CP-OFDM. burst_length[0] $\in \{1, \ldots, 511\}$ burst_length[1] $\in \{0, \ldots, 511\}$. |
| ptrs_dfts_ofdm_delta | [0, 1] | 1 | $\Delta \in \{0, 1\}$ of the PTRS allocation for the DFTs-OFDM case when rs_mapping_type = 5. |
| ack_enc_cat | [0, 4] | 3 | The type of ACK bits : 0: no ACK 1: number of ACK bits = 1 2: number of ACK bits = 2 3: number of ACK bits = [3, 11] 4: number of ACK bits >= 12 |
| csi1_enc_cat | [0, 4] | 3 | The type of CSI1 bits : 0: no CSI1 1: number of CSI1 bits = 1 2: number of CSI1 bits = 2 3: number of CSI1 bits = [3, 11] 4: number of CSI1 bits >= 12 |
| csi2_enc_cat | [0, 4] | 3 | The type of CSI2 bits : 0: no CSI2 1: number of CSI2 bits = 1 2: number of CSI2 bits = 2 3: number of CSI2 bits = [3, 11] 4: number of CSI2 bits >= 12 |
| ack_rsv_d_re | [0, 1650] | 11 | The step size for the ACK reserved REs in the case of ACK <= 2 bits. |
| ack_rsv_m_re | [0, 3300] | 12 | The number of REs reserved for ack bits in the case of ack_enc_cat = 1 or 2; |
| ack_d_re | [0, 1650] | 11 | The symbol-wise step size in RE for the ACK bits. |
| ack_m_re | [0, 3200] | 12 | The symbol-wise number of REs for the ACK bits. |
| ack_bit_offset | [0, 127] | 7 | The symbol-wise read pointer for the ACK bits with a 64-b word; |
| csi1_d_re | [0, 1650] | 11 | The symbol-wise step size in RE for the CSI1 bits. |
| csi1_m_re | [0, 3300] | 12 | The symbol-wise number of REs for the CSI1 bits. |
| csi1_bit_offset | [0, 127] | 7 | The symbol-wise read pointer for the CSI1 bits. It indicates the offset in bit within a 64-b word. |
| csi2_d_re_csi2 | [0, 1650] | 11 | The symbol-wise step size in RE for the CSI2 bits. |
| csi2_m_re_csi2 | [0, 3300] | 12 | The symbol-wise number of REs for the CSI2 bits. |
| csi2_bit_offset_csi2 | [0, 127] | 7 | The symbol-wise read offset within a 64-b word or the CSI2 bits; |
| data_m_re | [0, 3200] | 12 | The symbol-wise number of REs for the data bits. |
| data_bit_offset | [0, 127] | 7 | The symbol-wise read pointer for the data bits within a 64-b word; |
| scrambling_init | [0, 2^31-1] | 31 | Initial value of the scrambler second m-sequence |
| scrambling_offset | [0, 2^32-1] | 32 | Number of steps to run idle the scrambling sequence before scrambling the first bit, on top of the 1600 first steps. |

-continued

| Parameter | Range | Bitwidth | Comment |
|---|---|---|---|
| num_layers | {1, 2, 3, 4} | 3 | Number of layers<br>1: one layer<br>2: two layers<br>3: three layers<br>4: four layers<br>Note: num_layers shall be 1 for mod_order == 1 |
| bypass_scrambler | {0, 1} | 1 | If set to '1', Scrambling is bypassed. |
| mod_order | {1, 2, 4, 6, 8} | 4 | Modulation order<br>1: BPSK or pi/2 BPSK<br>2: QPSK<br>4: 16QAM<br>6: 64QAM<br>8: 256QAM. |
| reenc_data_mode | {0, 1, 2} | 2 | Bit packing mode for the reencoded data bits:<br>0: plain bit stream of reencoded data bits packed one-by-one.<br>1: CRC tagged in each Q_m (modulation order) bits of reencoded data bits. Only applies to DATA stream. ACK and CSI streams have always Qm-symbols (no CRC bit at Core input). The Core shall add a CRC OK (flag = 0) bit at the output. |

Figure 5:
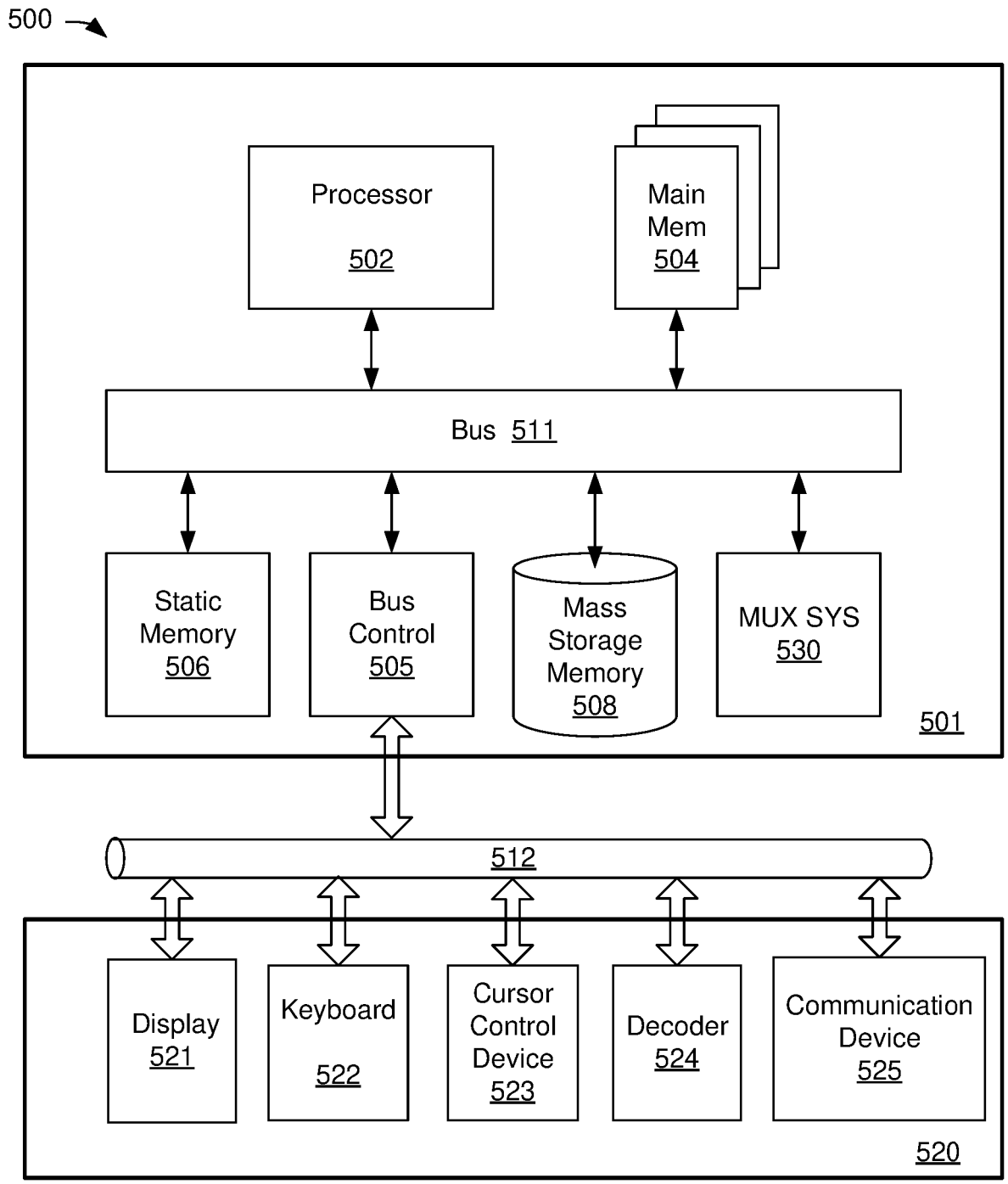
FIG. 5 is a block diagram an exemplary digital computing system with various feature of networking transmission in accordance with one embodiment of the present invention.

FIG. 5 illustrates an exemplary digital computing system 500 that includes an exemplary embodiment of a multiplexing system 530. It will be apparent to those of ordinary skill in the art that other alternative computer system architectures may also be employed.

Computer system 500 includes a processing unit 501, an interface bus 512, and an input/output ("IO") unit 520. Processing unit 501 includes a processor 502, main memory 504, system bus 511, static memory device 506, bus control unit 505, and mass storage memory 508. Bus 511 is used to transmit information between various components and processor 502 for data processing. Processor 502 may be any of a wide variety of general-purpose processors, embedded processors, or microprocessors such as ARM® embedded processors, Intel® Core™2 Duo, Core™2 Quad, Xeon®, Pentium™ microprocessor, AMD® family processors, MIPS® embedded processors, or Power PC™ microprocessor.

Main memory 504, which may include multiple levels of cache memories, stores frequently used data and instructions. Main memory 504 may be RAM (random access memory), MRAM (magnetic RAM), or flash memory. Static memory 506 may be a ROM (read-only memory), which is coupled to bus 511, for storing static information and/or instructions. Bus control unit 505 is coupled to buses 511-512 and controls which component, such as main memory 504 or processor 502, can use the bus. Mass storage memory 508 may be a magnetic disk, solid-state drive ("SSD"), optical disk, hard disk drive, floppy disk, CD-ROM, and/or flash memories for storing large amounts of data.

I/O unit 520, in one example, includes a display 521, keyboard 522, cursor control device 523, decoder 524, and communication device 525. Display device 521 may be a liquid crystal device, flat panel monitor, cathode ray tube ("CRT"), touch-screen display, or other suitable display device. Display 521 projects or displays graphical images or windows. Keyboard 522 can be a conventional alphanumeric input device for communicating information between computer system 500 and computer operators. Another type of user input device is cursor control device 523, such as a mouse, touch mouse, trackball, or other type of cursor for communicating information between system 500 and users.

Communication device 525 is coupled to bus 512 for accessing information from remote computers or servers through wide-area network. Communication device 525 may include a modem, a router, or a network interface device, or other similar devices that facilitate communication between computer 500 and the network. In one aspect, communication device 525 is configured to perform wireless functions.

In an embodiment, the multiplexer system 530 is coupled to bus 511 and is configured to provide symbol-by-symbol UCI and data multiplexing with bit-masking assisted DMRS and PTRS mapping in 5G NR applications as described above. In exemplary embodiments, the multiplexer system 530 comprises hardware, firmware, or a combination of hardware and firmware.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. An apparatus for facilitating a wireless communication, comprising:
   a processor capable of generating mapping parameters in accordance with software intermediate parameter calculation for facilitating symbol based resource element (RE) mapping; and
   an accelerator, having multiple hardware components, coupled to the processor and operable to calculate a symbol level reserved location in a first RE of a first symbol for a first reference symbol (RS) in response to the mapping parameters, wherein the accelerator subsequently inserts the first RS into the symbol level reserved location in the first RE of a first modulated symbol after performance of modulating the first symbol so that modulation and scrambling processes for the first RS are bypassed.

2. The apparatus of claim 1, wherein the accelerator further includes a reserved location calculator operable to mark a reserved resource element of a symbol for an RS.

3. The apparatus of claim 1, wherein the accelerator further includes a job engine configured to write at least one of data, ACK, CSI1, and CSI2 data types into unreserved REs of the first symbol according to the mapping parameters.

4. The apparatus of claim 3, wherein the job engine is configured to produce a multiplexed bit sequence in response to the first symbol while reserved REs of the first symbol are bypassed from a multiplexing process.

5. The apparatus of claim 1, wherein the accelerator further includes a scrambler configured to scramble a multiplexed bit sequence in response to a multiplexed bit sequence of a symbol to generate a scrambled bit sequence.

6. The apparatus of claim 1, wherein the accelerator further includes a downstream processor configured to modulate a scrambled bit sequence to produce the first modulated symbols in response to the first symbol.

7. The apparatus of claim 6, wherein the downstream processor is able to insert the first RS into the first RE of the first modulated symbols.

8. The apparatus of claim 1, wherein the accelerator is configured to reserve a second RE of a first symbol for a first RS in response to the mapping parameters and inserting the second RS into the second RE of the first modulated symbol after performance of modulation the first symbol.

9. The apparatus of claim 8, wherein the accelerator is configured to reserve a second RE of a second symbol for a second RS in response to the mapping parameters and inserting the second RS into the second RE of a second modulated symbol after performance of modulation the second symbol.

10. The apparatus of claim 1, wherein the processor includes a job descriptor generator that generates predetermined parameters that determine how the at least one data type is written into available REs.

11. The apparatus of claim 3, wherein the job engine arranges an order of a writing operation based on a number of ACK bits.

12. The apparatus of claim 11, wherein the job engine arranges the order of the data types in a writing operation to be ACK, CSI1, CSI2, and data when the number of the ACK bits is greater than two.

13. The apparatus of claim 3, wherein the job engine marks an RE as dirty after each write operation.

14. The apparatus of claim 13, wherein REs marked as dirty are not used for subsequent write operations.

15. The apparatus of claim 11, wherein the job engine arranges an order of data types in a writing operation to be CSI1, CSI2, data, and ACK when number of ACK bits is less than or equal to two.

16. A method for a wireless communication network, comprising:
calculating predetermined parameters indicating one or more data types to be written into available resource elements (REs) of a symbol;
calculating a first reserved location in a first RE of the symbol for a first reference symbol (RS) while remaining REs are available for carrying uplink control information (UCI) and data;
writing at least one of data and UCI into available REs of the symbol; and
inserting, after the symbol is modulated and scrambled, the first RS into the first reserved location in a first RE of a modulated symbol whereby a process of modulating and scrambling the first RS is bypassed.

17. The method of claim 16, further comprising scrambling a multiplexed bit sequence to generate a scrambled bit sequence.

18. The method of claim 17, further comprising modulating the scrambled bit sequence to produce one or more modulated symbols.

19. The method of claim 16, wherein writing at least one of data and UCI includes selecting one of data types from acknowledgment (ACK), first channel state information (CSI1), and second channel state information (CSI2) data types.

20. The method of claim 16, further comprising generating a multiplexed bit sequence after writing operation while bypassing multiplexing of the first reserved RE.

21. The method of claim 16, wherein calculating predetermined parameters includes generating parameters to determine how at least one data type is written into available resource elements.

22. The method of claim 16, further comprising arranging an order of the writing operation based on a number of acknowledgment (ACK) bits.

23. The method of claim 22, wherein arranging an order includes arranging an order of data types in a writing operation to be ACK, CSI1, CSI2, and data when number of ACK bits is greater than two.

24. The method of claim 16, wherein writing at least one of data and UCI includes marking a resource element as dirty after each write operation.

25. The method of claim 24, wherein the write operation is performed without puncturing previously written resource elements.

26. The method of claim 22, wherein arranging an order includes arranging an order of data types in a writing operation to be CSI1, CSI2, data, and ACK when number of ACK bits is less than or equal to two.

27. The method of claim 16, wherein marking a first reserved RE includes reserving an RE of the symbol for a Phase Tracking Reference Symbols (PTRS) or Demodulation Reference Symbols (DMRS).

28. A method for a wireless communication, comprising:
identifying a resource element (RE) of a symbol as a reserved RE for carrying a reference symbol (RS) while remaining REs of the symbol are available for carrying data and uplink control information (UCI);
calculating a symbol level reserved location associated to the RE in the symbol;
arranging an order of data types for a writing operation to be acknowledgment (ACK), first channel state information (CSI1), and second channel state information (CSI2), and data when number of ACK bits is greater than two; and
arranging an order of data types for a writing operation to be CSI1, CSI2, data, and ACK when the number of ACK bits is less than or equal to two.

29. The method of claim 28, further comprising calculating predetermined parameters indicating one or more data types to be written into available REs of the symbol.

30. The method of claim 28, further comprising writing at least one of data and UCI into available REs of the symbol.

31. The method of claim 30, further comprising scrambling a multiplexed bit sequence to generate a scrambled bit sequence.

32. The method of claim 31, further comprising modulating the scrambled bit sequence to produce one or more modulated symbols.

33. The method of claim 32, further comprising inserting the first RS into a first reserved RE of a modulated symbol after the symbol is modulated and scrambled.

34. The method of claim 28, wherein reserving an RE of a symbol includes marking an RE of the symbol for a Phase Tracking Reference Symbols (PTRS).

35. The method of claim 28, wherein reserving an RE of a symbol includes marking an RE of the symbol for a Demodulation Reference Symbols (DMRS).

36. An apparatus for a wireless communication network, comprising:
   means for calculating predetermined parameters indicating one or more data types to be written into available resource elements (REs) of a symbol;
   means for calculating a first reserved location in a first RE of the symbol for a first reference symbol (RS) while remaining REs are available for carrying uplink control information (UCI) and data;
   means for writing at least one of data and UCI into available REs of the symbol; and
   means for inserting, after the symbol is modulated and scrambled, the first RS into a first reserved RE of a modulated symbol whereby a process of modulating and scrambling the first RS is bypassed.

37. The apparatus of claim 36, further comprising means for scrambling a multiplexed bit sequence to generate a scrambled bit sequence.

38. The apparatus of claim 37, further comprising means for modulating the scrambled bit sequence to produce one or more modulated symbols.

39. The apparatus of claim 36, wherein means for writing at least one of data and UCI includes means for selecting one of data types from acknowledgment (ACK), first channel state information (CSI1), and second channel state information (CSI2) data types.

40. The apparatus of claim 36, further comprising means for generating a multiplexed bit sequence after writing operation while bypassing multiplexing of the first reserved RE.

* * * * *